Feb. 17, 1959  G. COELHO  2,873,547
CASTING DEVICE
Filed Aug. 29, 1957
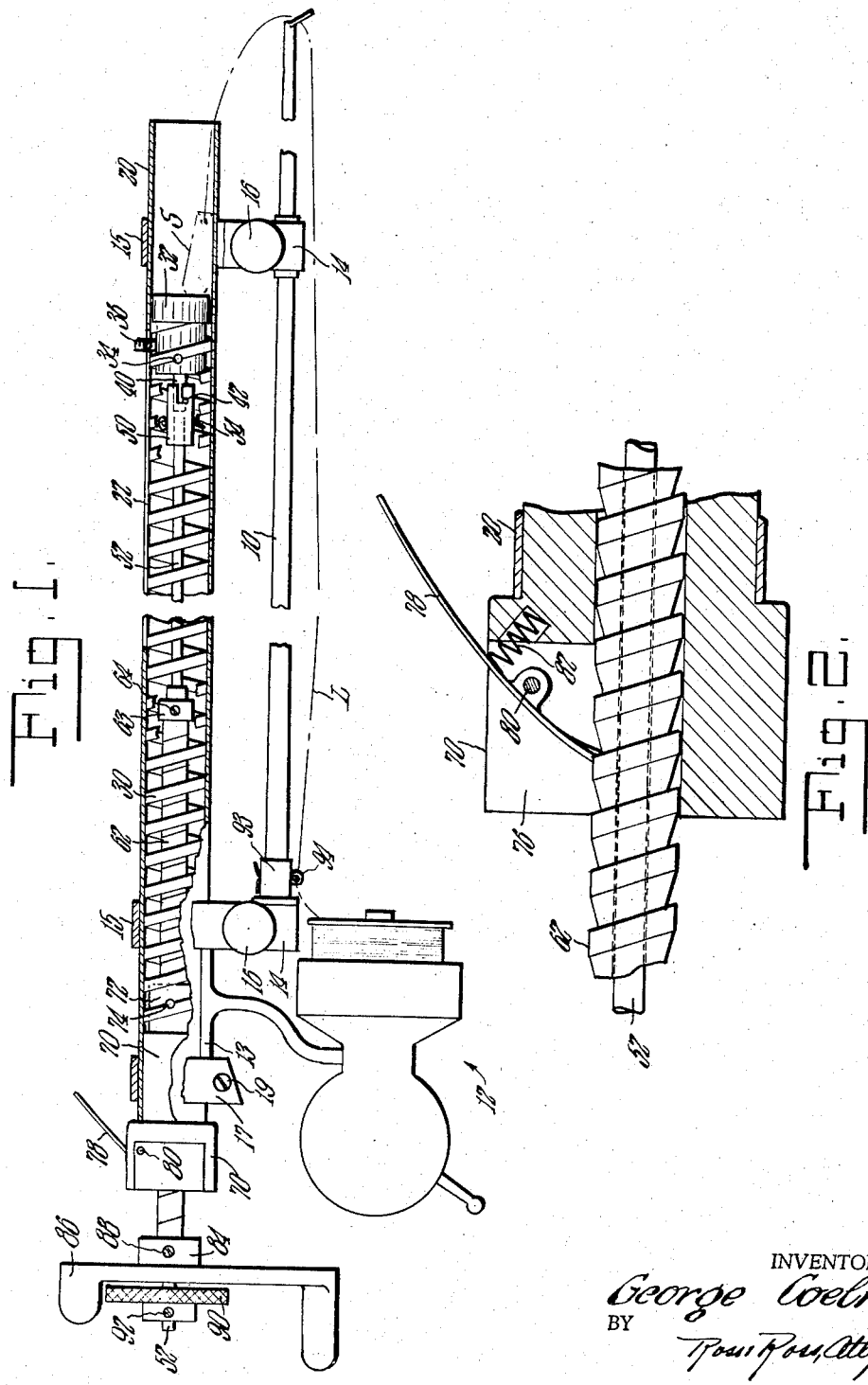
INVENTOR.
George Coelho.
BY

United States Patent Office 2,873,547
Patented Feb. 17, 1959

2,873,547

CASTING DEVICE

George Coelho, Elizabeth, N. J.

Application August 29, 1957, Serial No. 680,966

1 Claim. (Cl. 43—19)

My invention relates to new and useful improvements in structural refinements in a manually controlled mechanical line casting device for fishing poles and is directed more particularly to the provision of means attachable to a rod and reel whereby a sinker and line can be projected or thrown without the casting movement of the rod, and to an improvement in the means for accomplishing this action.

It frequently happens that when fishing by the casting method, the surroundings are unfavorable to the casting of the fly or other bait used and this for the reason that there may be overhanging limbs or other obstructions which prevent the necessary momentum for casting the bait the required distance. That is, the casting operations may not be efficiently performable due to the liability of the lines and hooks to become fouled by foliage or other obstructions during such operations.

This invention relates to a casting rod employing a gun mechanism attachable thereto in order to effect the casting, thereby rendering it easy for an amateur or child to cast with maximum accuracy.

It is the principal object of my invention to provide a novel and improved construction of the type which is readily and easily attachable to the conventional rod and casting reel combination and there is the further provision of a simple, practical and reliable casting or catapulting device which will eliminate the now present objectionable inconveniences and which will operate with a maximum amount of ease and with a minimum degree of effort.

One of the primary purposes of my invention is to provide structural and operational improvements in devices of the class to which reference has been made, which improvements not only simplify the structure as such, but also provide important distinct advantages in strength, durability, efficiency and the like.

A principal feature of the invention consists in associating with a rod and casting reel, a suitable gun-like means on said rod for casting or throwing or projecting the sinker and line in a greatly improved manner.

Another object of the invention is to provide a casting gun which may be attached to a fishing rod, which gun receives the sinker attached to the line and projects the same upon the operation of a releasing mechanism therewithin.

A further object of the invention is to provide a projecting mechanism which may be readily set by the insertion of the sinker thereinto, the construction being such that it may be conveniently carried on a fishing rod without materially adding to the weight of the rod or interfering with the use thereof.

A further object of the invention is to provide a device which can be utilized efficiently for casting purposes without the necessity for the operator to undergo the long period of practice and training usually without which proficiency in the use of the standard casting equipment cannot be acquired.

Another object of the invention is to provide a simple, practical and reliable casting or catapulting device which is characterized by a spring projected firing pin, a spring anchoring and tensioning member, and a handily arranged pivotally mounted trigger latch releasably engaged with the firing pin.

Another object hereof is the provision of means whereby a line may be cast in an easy and accurate manner for any desired or predetermined distance.

A further object hereof is the provision of a casting means which may be readily and easily attached to or detached from any ordinary construction of fishing poles for facilitating and rendering accurate the casting of the line and which will not interfere with the reeling of the line or the casting of the line in the ordinary manner should such method of casting be desired.

Another object hereof is to provide a device of the character stated which functions as a gun having a trigger and a projecting means released thereby which functions to discharge a projectile as far as may be desired, and in accordance with the aim of the operator.

Another object hereof is to provide a device of the character stated, which permits the ordinary inexperienced fisherman to cast accurately in the surf or elsewhere, and enable him to enjoy the sport of fishing under such circumstances, which is now only enjoyed by those expert in casting.

Another object hereof is to provide a device of the character stated which can be so adjusted as to permit the discharge or ejection of the projectile the desired distance by simply adjusting the tension of a spring, the compression of which is indicated by suitable marks on the screw of the device.

With the above primary objects in view, it is another object of my invention to provide a construction of the above described character in which the number of operating parts is greatly reduced and which is compact in accordance with the demands and desires of manufacturers and purchasers alike and which is not only distinctive in its appearance and practical in its value but also reliable in its operation and efficient in its use.

It is a still further object to provide a device which is constructed of parts which are adapted to be readily assembled and which when once assembled are positively and securely retained in operative relationship and which cannot be readily separated from each other, either accidentally or otherwise.

Some of the advantages of the invention reside in its simplicity of construction, in its efficient and dependable operation, and in its adaptability to economical manufacture.

Further objects and advantages of my invention will become apparent as the following description proceeds, and the features of novelty which characterize my invention will be pointed out with particularity in the claim annexed to and forming part of this specification.

In the drawing:

Fig. 1 is a side elevational view of the device of the invention with certain parts shown in section for the sake of clarity; and Fig. 2 is an enlarged fragmentary sectional view of certain components of the invention for purposes of illustrating certain of the details thereof.

The invention is not limited in its application to the details of construction and arrangement of parts illustrated in these drawings, since the invention is capable of other embodiments and it is to be understood that the phraseology or terminology employed herein is for the purpose of description and not of limitation. It will be further understood that forms of spraying devices other than the particular electrostatic atomizing device shown may be utilized and that other apparatus may be employed for accomplishing the purposes and for practicing the methods of the invention. It is still further to be understood that other embodiments may be utilized without departing from the contemplated scope of the present invention and that no limitations are to be implied from the following specific description.

In this drawing, I have illustrated an example of one embodiment of the invention wherein the parts are combined and arranged in accordance with one mode which I have devised for the practical application of the principles of the invention. It will be understood however that changes and alterations are contemplated and may be made within the scope of the claims, without departing from the basic principles of the invention.

While I have illustrated and described the invention as embodied in certain specific arrangements, I do not intend to be limited to the details shown since various modifications and structural changes may be made without departing in any way from the spirit of the invention. Without further analysis, the foregoing is intended to so fully reveal the gist of my invention that others can, by applying current knowledge, readily adapt it for various applications without omitting features which, from the standpoint of prior art, fairly constitute essential characteristics of the generic or specific aspects of this invention, and therefore, such adaptations should and are intended to be comprehended within the meaning and range of equivalence of the claim below.

10 represents a fish pole of any desired length and 12 generally designates a reel of any conventional type with L representing a fish line unwound from the reel and S representing a sinker attached to the outer free end of said fish line L. These components do not form a part of this invention. The mechanism of the invention generally includes the fire control elements of the device and same are readily attachable to and/or detachable from such a fish pole as represented by 10 by means of clamping or gripping members 14 which may be secured to the fish pole as by the conventional tightening screws 16.

The mid section 15 of each clamp 14 is circular in shape and encircles the outside of the gun barrel and may be tightened or loosened relative thereto by means of its respective screw 16, all as is conventional and well known.

It will thus be appreciated that the gun barrel is thus slidably supported upon the rod and may be held fast thereto at any desired position therealong.

The reel 12 may be held relative to the gun barrel 20 through the conventional feet 13 of the reel, one foot being clamped against the outer surface of the barrel by means of one of the clamps 14, as shown, and the other foot being clamped against the outer surface of the barrel by means of another clamp 17 which may encircle the barrel and be tightened or loosened relative thereto by means of a set screw 19, all as is conventional and well known.

The barrel is a smooth walled cylinder which is open at both of its ends. The interior of the barrel is designed for the conventional reception therewithin of the firing mechanism of the invention shortly to be described.

The barrel is provided with an elongated longitudinal slot 22 on the top side thereof through a portion of the overall length thereof as shown for purposes shortly to appear.

A compressible spring 30 is of a configuration and dimension complementary to the inside of the barrel and is constrained to straight fore and aft movements reciprocal therewithin, it being movable between an extended or released position, as shown, and a compressed position, as will hereinafter appear.

The forward end of the spring 30 is connected to a firing pin member 32, which member is likewise of a configuration and dimension complementary to the inside of the barrel and is likewise reciprocal therewithin, it being movable between its forwardmost or fixed position, as shown, and its rearmost cocked or ready-to-fire position as will hereinafter appear.

The spring 30 and firing pin 32 are fixed to each other by means of a pin 34 or equivalent connecting means.

A set screw 36 is threadedly engageable with the firing pin 32 and extends vertically and upwardly therefrom so as to provide a guide means, same being receivable through and slidable along the slot 22 of the barrel to the end that the forward and rearward sliding motion of the firing pin 32 within and relative to the barrel is limited and/or controlled.

The forwardmost face of the firing pin 32 is smooth and, in operation, is adapted to hit the sinker S with a force sufficient to urge it forwardly through the barrel and to project it forwardly therefrom.

The rearmost face of the firing pin 32 is provided with a rearwardly extending projection or stud 40 from which a pin 42 extends transversely thereto and outwardly therefrom, which pin is adapted to serve as the male member of a bayonet joint between said firing pin and a terminal 50 fixed to the outer end of an elongated rod member 52 longitudinally disposed within the spring member 30.

The terminal 50 is keyed to the forward extremity of the rod member 52 as by a cotter pin 54 or the like so as to prevent relative movements thereof and is slotted in the conventional manner so as to receive and hold the pin 42 of the firing pin 32 whereby the firing pin and rod member may be securely held to each other and/or may be disengaged from each other by rotating the rod member relative to the firing pin, all as is well known.

The rod member 52 extends rearwardly through the barrel 20 and extends outwardly away therefrom.

A screw member 62 is disposed within the spring member and is provided with a longitudinal bore through which the rod member 52 is receivable.

At the forward extremity of the screw 62, a bearing member 63 is provided, which member 63 is fixed to the rod member 52 as by a screw 64 or the like to aid in the rotating of the rod member independent of the screw, as will hereinafter appear.

The rear extremity of the spring 30 is secured to a hub portion 72 of a receiver 70 as by a pin 74 or the like.

The receiver 70 has a midsection of circular cross section which is of such a diameter as to be snugly receivable within the barrel 20.

The receiver 70 also has a rearmost enlarged portion providing a shoulder which is adapted to abut against the inner end of the barrel 20 and is bifurcated on its top side to provide space of parallel vertically extending side walls 76 between which a trigger member 78 may be disposed.

Said trigger 78 is pivoted by a pin 80 extending between the said side walls 76 and is urged outwardly by means of a spring 82 which is seated in the member 70 substantially as shown.

The lower end of the trigger 78 is releasably engageable with the screw 62. As said screw is rotated, said lower end of the trigger engages the screw for the screw action so that the screw may be rotated rearwardly and/or forwardly relative to the barrel 20 and the receiver 70.

It is to be understood however that the trigger 78 is releasable from its aforedescribed function inasmuch as the upper end of the trigger has a finger gripping portion which may be manually engaged so as to move the trigger into and out of locking engagement with the screw 62.

When the trigger is out of locking engagement with the screw, said screw and the rod 52 may be moved forwardly and rearwardly within the barrel at will and without the screw action. This feature is particularly important in the initial stages of operation where it is desired to engage the rod member 52 with the firing pin 32 for the cocking procedure.

The inner free end of the screw 62 is fixed to the hub 84 of a rotatable handle member 86 as by a set screw 88 or the like. By the rotation of the handle 86, the screw may be threaded rearwardly against the trigger 78.

The inner free end of the rod member 52 is fixed to a rotatable wheel 90 by means of a pin 92 or like member.

With the terminal 50 keyed to the firing pin 32, and with the screw member 62 being threaded rearwardly, the handle member 86 moves to the rear so as to urge the wheel 90 and the rod member 52 to the rear therewith.

As the rod member 52 so moves rearwardly, the spring 30 is compressed into a ready to fire position.

The screw is moved a certain predetermined distance to the rear depending upon the extent of the trajectory desired, all as experience may dictate.

If desired, the screw or the barrel (as desired) may be provided with indicia whereby the spring can be given any desired pressure or tension so as to throw the projectile the desired distance.

The sinker S is then placed in the barrel 20 forwardly of the firing pin 32 so as to be projected downwardly thereby upon the release of the firing pin from the member 50, which release is accomplished by a turning of the wheel 90 whereby the pin 42 is released from engagement with the member 50 so as to permit the spring to be released forwardly from its compressed position and thus to urge the firing pin forwardly and to discharge the device whereby the sinker S is projected forwardly through and out the muzzle of the barrel 20.

That is to say, the spring 30 constitutes the power means for moving the firing pin forwardly so as to project the sinker or bait forwardly from within the barrel for casting purposes. As the sinker or bait is projected forwardly, the line L feeds out from the reel 12, said line L passing through an eye 94 or equivalent which is secured to the ferrule 93 of a fish pole 10.

I claim:

A gun mechanism attachable to and supported by a reel-equipped fishing rod for projecting a combination line and sinker forwardly therefrom without a casting movement of the rod comprising, a plurality of clamps securable at longitudinally-spaced positions along the fishing rod, an open-ended barrel releasably supported by the clamps of said plurality thereof in spaced parallelism with the fishing rod, a compressible spring constrained to straight fore and aft movements within said barrel between an extended fixed position and a compressed ready-to-fire position, said barrel having an elongated longitudinal slot through the wall thereof, a firing pin fixed to said spring and being reciprocal therewith within said barrel between fixed and ready-to-fire positions, a guide means fixed to said firing pin and having an upstanding extremity slidably receivable within the slot in said barrel for the control of movement of said firing pin between the fired and ready-to-fire positions, an elongated rod longitudinally disposed within said spring and disengageably connected to said firing pin, a screw cooperating with said rod for compressing said spring and retracting said firing pin into ready-to-fire position, said screw being disposed within said spring and provided with a longitudinal bore through which said rod is receivable, a bifurcated receiver securable within said barrel at the rearmost extremity thereof, the rear extremity of said spring being fixed to said receiver, a rotatable handle fixed to said screw for effecting the rotation thereof, a spring actuated trigger pivotally mounted in the slot of said receiver and having a lower end releasably engageable with said screw and an upper finger for manually maintaining said trigger in locking engagement with said screw whereby said screw and rod and firing pin may be retracted rearwardly under compression relative to said barrel preparatory to the release of said firing pin from said rod for the release of said spring from its compressed position and the forward propulsion of said firing pin forwardly to strike the sinker and project the same with the line thereon for casting purposes.

References Cited in the file of this patent

UNITED STATES PATENTS

| | | |
|---|---|---|
| 2,305,176 | Littman | Dec. 15, 1942 |
| 2,584,678 | Dewey | Feb. 5, 1952 |
| 2,605,569 | Kronahaus | Aug. 5, 1952 |

FOREIGN PATENTS

| | | |
|---|---|---|
| 359,109 | Germany | 1922 |